(12) United States Patent
Berger et al.

(10) Patent No.: US 7,912,038 B2
(45) Date of Patent: *Mar. 22, 2011

(54) SYSTEM AND METHOD FOR UTILIZING CIRCUIT SWITCHED AND PACKET SWITCHED RESOURCES

(76) Inventors: H. Stephen Berger, Georgetown, TX (US); Michael G. Duncan, Austin, TX (US); Andrew W. Jackson, Austin, TX (US)

(*) Notice: Subject to any disclaimer, the term of this patent is extended or adjusted under 35 U.S.C. 154(b) by 1233 days.

This patent is subject to a terminal disclaimer.

(21) Appl. No.: 11/105,910

(22) Filed: Apr. 13, 2005

(65) Prior Publication Data

US 2006/0023696 A1 Feb. 2, 2006

Related U.S. Application Data

(63) Continuation of application No. 09/668,696, filed on Sep. 22, 2000, now Pat. No. 6,882,640.

(51) Int. Cl.
*H04L 12/66* (2006.01)
(52) U.S. Cl. .................. 370/352; 370/355; 370/354
(58) Field of Classification Search .................. None
See application file for complete search history.

(56) References Cited

U.S. PATENT DOCUMENTS

| | | | | |
|---|---|---|---|---|
| 4,837,816 A * | 6/1989 | Mizuhara et al. | ........ | 379/209.01 |
| 6,061,559 A * | 5/2000 | Eriksson et al. | ........... | 455/435.3 |
| 6,167,043 A | 12/2000 | Frantz | | |
| 6,205,135 B1 | 3/2001 | Chinni et al. | | |
| 6,307,853 B1 | 10/2001 | Storch et al. | | |
| 6,345,047 B1 | 2/2002 | Regnier | | |
| 6,442,159 B2 * | 8/2002 | Josse et al. | ..................... | 370/354 |
| 6,480,581 B1 | 11/2002 | Wu et al. | | |
| 6,487,197 B1 | 11/2002 | Elliott | | |
| 6,507,648 B1 | 1/2003 | Golka et al. | | |
| 6,510,219 B1 | 1/2003 | Wellard et al. | | |
| 6,560,223 B1 * | 5/2003 | Egan et al. | ..................... | 370/356 |
| 6,597,686 B1 | 7/2003 | Smyk | | |
| 6,608,832 B2 | 8/2003 | Forslow | | |
| 6,639,913 B1 | 10/2003 | Frankel et al. | | |
| 6,934,258 B1 * | 8/2005 | Smith et al. | ................... | 370/238 |
| 2001/0036172 A1 | 11/2001 | Haskal | | |

FOREIGN PATENT DOCUMENTS

| | | |
|---|---|---|
| EP | 0920176 A2 | 6/1999 |
| WO | WO0014935 | 3/2000 |

OTHER PUBLICATIONS

International Preliminary Report on Patentability for corresponding European Application No. EP01307537, dated Dec. 2, 2005 (2 pages).

* cited by examiner

*Primary Examiner* — Duc C Ho
(74) *Attorney, Agent, or Firm* — McDonnell Boehnen Hulbert & Berghoff LLP

(57) ABSTRACT

A system and method for utilizing circuit switched and packet switched resources are disclosed. A voice communication system configured for routing calls from multiple users to circuit switched or packet switched resources generally comprises a hub in communication with at least one circuit switched channel, at least one packet switched channel, and a plurality of user devices. The system further includes a controller operable to select the circuit switched channel or the packet switched channel for connection with one of the user devices when a call is placed to or from the user device and a routing device operable to route the call from the user device to the selected channel.

18 Claims, 8 Drawing Sheets

SYSTEM AND METHOD FOR UTILIZING CIRCUIT SWITCHED AND PACKET SWITCHED RESOURCES

CROSS-REFERENCE TO RELATED APPLICATIONS

This application is a continuation of application Ser. No. 09/668,696 filed Sep. 22, 2000 now U.S. Pat. No. 6,882,640 of the same title.

FIELD OF THE INVENTION

The present invention relates generally to communication systems, and more specifically, to a voice communication system operable to utilize both circuit switched and packet switched resources.

BACKGROUND OF THE INVENTION

Most telephone service subscribers use plain old telephone service (POTS) for placing ordinary voice calls. POTS is typically delivered over a subscriber loop between the subscriber's home or office and the local telephone company central office. The telephone company central offices provide a circuit switched network to establish connections between subscribers. A circuit switched connection provides relatively low and constant signal delay and guarantees full throughput for the duration of the call. Circuit switching, thus, provides a generally high quality of service connection for switched voice calls.

Data networks employ packet switched networks to move data in separate, small blocks (packets) based on the destination address in each packet. Circuit switching and packet switching differ in many respects. Circuit switching statically reserves the required bandwidth in advance, whereas packet switching acquires and releases it as it is needed. With circuit switching, any unused bandwidth on an allocated circuit is just wasted. With packet switching it may be utilized by other packets from unrelated sources going to unrelated destinations, since circuits are not dedicated.

A further difference between circuit and packet switching is the charging algorithm. Packet carriers usually base their charge on both the number of bytes (or packets) carried and the connect time. Transmission distance usually does not matter with packet switching. With circuit switching, the charge is based on the distance and time only, and not the traffic. Circuit switched networks and packet switched networks have traditionally occupied different spaces within offices. Circuit switched networks are typically used for phone calls and packet switched networks are typically used to handle data. However, due to the reach of phone lines and the efficiency and low cost of data networks, the two technologies may be beneficially used together.

Multi-line products are often required for small offices, home offices, or similar applications. However, the costs for equipment and service make it impractical for multiple phone line installations. VoIP (Voice over Internet Protocol) packet switched service can be used to provide additional voice channels without requiring additional phone lines. There are situations, however, where VoIP may not be suitable since this technology typically suffers from quality of service issues.

There is, therefore, a need for a system and method that allows for dynamic allocation of packet switched and circuit switched resources based on a user's needs to provide multiple voice channels without requiring additional multi-line equipment.

SUMMARY OF THE INVENTION

A system and method for utilizing circuit switched and packet switched resources are disclosed. A voice communication system configured for routing calls from multiple users to circuit switched or packet switched resources generally comprises a hub in communication with at least one circuit switched channel, at least one packet switched channel, and a plurality of user devices. The system further includes a controller operable to select the circuit switched channel or the packet switched channel for connection with one of the user devices and a routing device operable to route the call from the user device to the selected channel.

The controller may be configured to select the channel based on quality of service, cost of the call, or status of the user, for example.

The network devices may be, for example, computers or telephones, and may be coupled to the hub by wires or in communication with the hub by wireless means. The user devices may be configured to utilize voice over Internet protocol, for example.

In another aspect of the invention, a voice communication system generally comprises a hub operable to provide circuit switched resources and packet switched resources to a plurality of user devices in communication with the hub to connect a user with a telephone network. The system further includes a means for selecting one of the circuit switched and packet switched resources for connection with one of the user devices and means for routing a call from the user device to the selected resource.

A method of the present invention for completing a voice connection generally comprises receiving a call request at a communication system coupled to at least one circuit switched channel and at least one packet switched channel. One of the circuit switched channel and packet switched channel is selected to connect the call with a telephone network. The method further includes establishing a voice channel with the telephone network over the selected channel.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
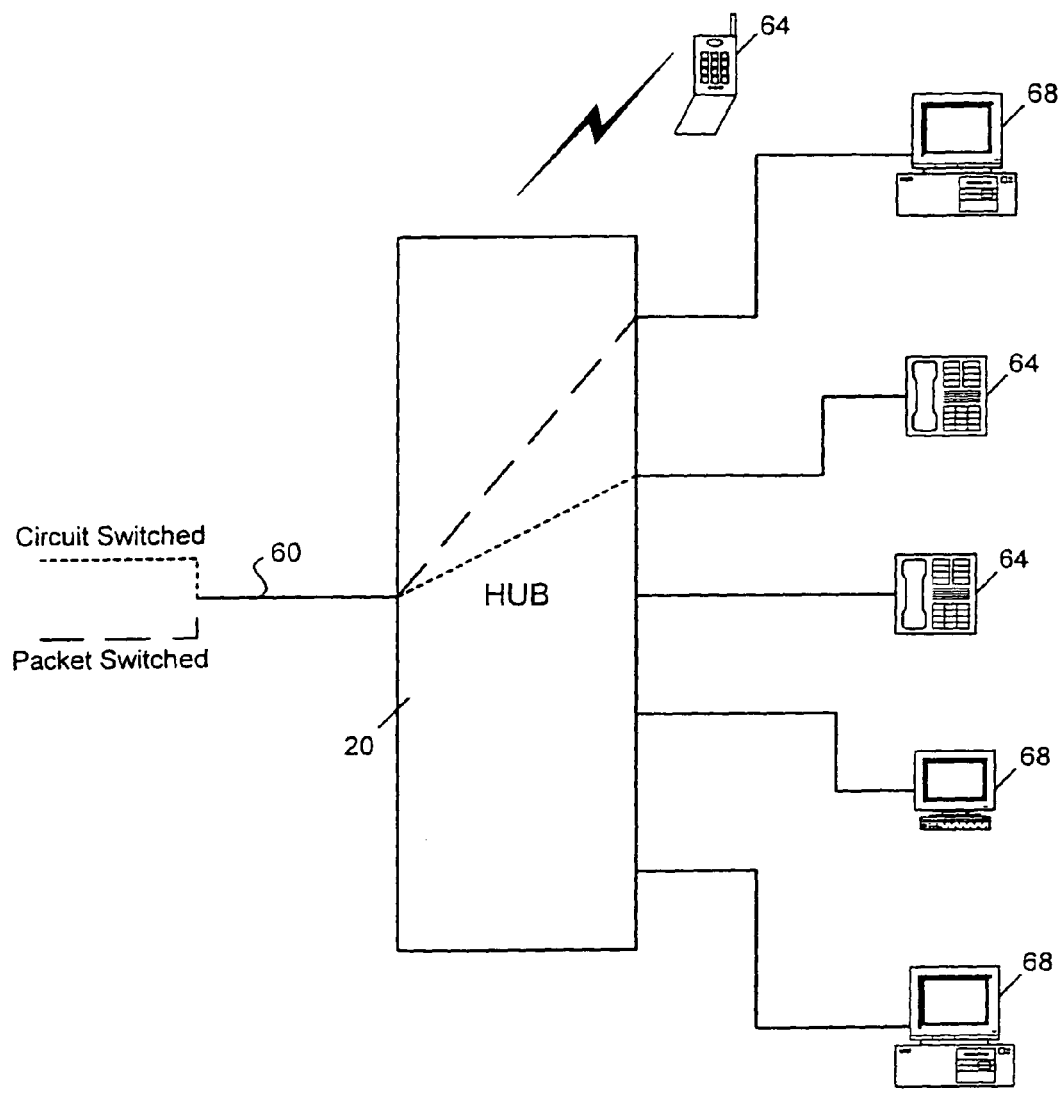
FIG. 1 is a schematic illustrating one embodiment of a system of the present invention for utilizing circuit switched and packet switched resources.

Referring now to the drawings, and first to FIG. 1, a system of the present invention is shown. The system is used in the context of a communication system having a port or hub type device 20 which mediates external resources with internal distribution. As shown in FIG. 1, the device 20 has both circuit switched and packet switched resources available to it. As further described below, the system combines traditional circuit switched phone lines with packet switched resources, such as VoIP, to create a multi-line function.

Figure 2:
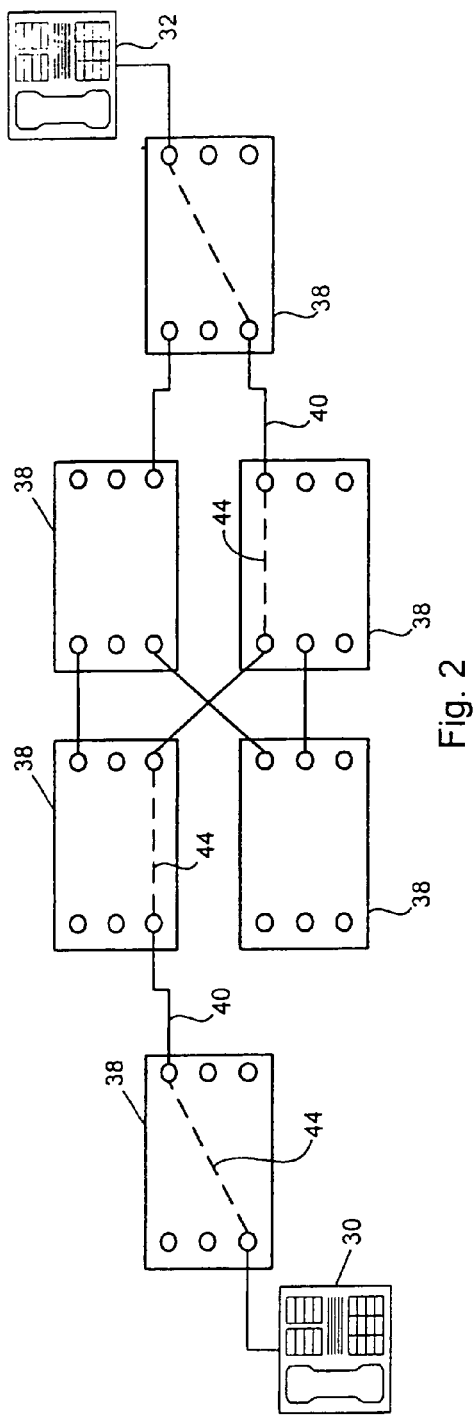
FIG. 2 is a schematic illustrating circuit switching.

The circuit switched network is schematically shown in FIG. 2. When a user (or computer) places a telephone call, the switching equipment within the telephone system seeks out a physical "copper" (or fiber, radio, etc.) path all the way from the user's telephone 30 to the receiver's telephone 32. Each of the rectangles 38 represents a carrier switching office (end office, toll office, etc.). In this example, each office 38 has three incoming lines and three outgoing lines 40. When a call passes through a switching office 38, a physical connection is established between the line on which the call came in and one of the output lines (shown as dotted lines 44). Once a call has been set up, a dedicated path between both ends exists and will continue to exist until the call is finished. The elapsed time between the end of dialing a number and the start of ringing may be ten seconds or more on long-distance or international calls. During this time, the telephone system is hunting for an available path. For many computer applications, (e.g., point of sale credit verification) long setup times are undesirable. Once the setup has been completed, the only delay for data is the propagation time for the signal. The circuit switched network provides a congestion free path.

Figure 3:
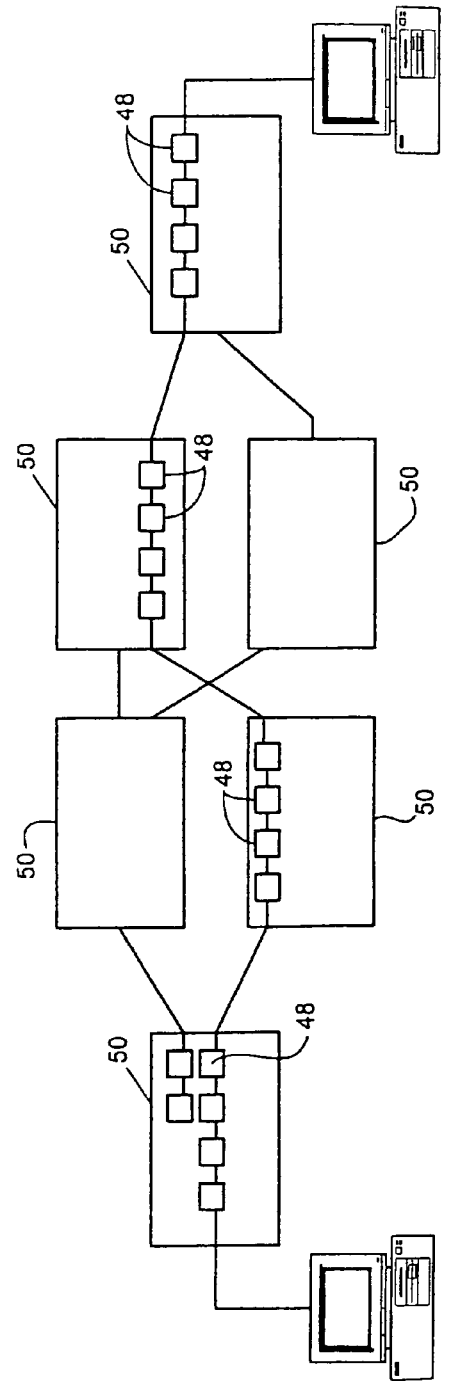
FIG. 3 is a schematic illustrating packet switching.

A schematic illustrating a packet switched network is shown in FIG. 3. Packet switched networks move data in separate, small blocks (packets 48) based on a destination address in each packet. When received, packets 48 are reassembled in the proper sequence to make up the message. The six rectangles 50 represent switching offices. The packets 48 are queued in the last switching office for subsequent transmission. With packet switching, a router examines each packet to determine its source and destination address and then forwards the packet to the next router in the path toward the destination. This architecture permits efficient statistical multiplexing of traffic, however, it is poorly suited for applications requiring assured throughput or low/constant delay, since no bandwidth is reserved or guaranteed with conventional packet switching. Thus, there are some applications in which circuit switched networks are better suited and other applications in which packet switched networks are more desirable. Also, there may be cases where circuit switching is preferred, but it is still acceptable to use packet switching, if circuit switched resources are not available.

The system of the present invention includes logic that is used to allocate either circuit switched or packet switched resources based on requirements of the user or availability of resources. For example, the resources may be allocated based on whether the user needs high quality of service or low cost service, as further described below.

Referring again to FIG. 1, the hub 20 is connected to a line 60 having both a circuit switched phone channel and a data channel capable of handling packet switched data. The hub 20 may be connected to these resources via an ADSL (Asymmetric Digital Subscriber Line), for example. ADSL is a local loop transmission technology that simultaneously transports digital data and analog voice (e.g., POTS) both downstream and upstream via one pair of wires. ADSL typically implements a digital subscriber line with a maximum data rate from the central office to the subscriber (i.e., downstream bit rate) which is higher than the maximum available data rate from the subscriber to the central office (i.e., upstream bit rate). Analog voice is transmitted at baseband frequencies and combined with pass-band data transmission via a low-pass filter (not shown). The present invention is not dependent on any one protocol. It is to be understood that other types of transmission may be used such as ISDN, DSL, XDSL (where X is any type of DSL variant such as ADSL, HDSL, or VDSL) or any other suitable type of transmission that provides both circuit switched and packet switched functionality. The system may include, for example, a network interface device (NID), which includes the low-pass filter which extracts the voice-band signals. The NID typically includes a means for separating voice frequency signals from data signals. Preferably, a splitter separates voice frequency signals from the data traffic sharing the subscriber loop wire pair. For example, to separate POTS from data traffic, the splitter typically includes a high-pass filter and a low-pass filter. To separate POTS voice signals, the low-pass filter blocks high frequency signals and passes only lower voice frequency signals on a conventional POTS loop. To recover data traffic, the high-pass filter blocks low frequency signals leaving only high frequency data traffic signals to be sent out on a separate data network loop.

It is to be understood that the system shown in FIG. 1 is only one example of a communication network system in which the present invention may be utilized. For example, the hub 20 may have more than one ADSL connected thereto to provide additional circuit switched and packet switched channels.

The hub 20 functions as a conduit between the circuit and packet switched resources and equipment connected thereto. As shown in FIG. 1, the hub 20 is connected to a plurality of user devices such as telephones 64 and computers 68. These devices 64, 68 may be connected to the hub 20 either by wires or wireless means. A network (e.g., LAN (local area network), WLAN (wireless LAN), or any other type of network) may be connected to the hub 20. The hub 20 thus creates a multi-line presentation to the network using a combination of the circuit switched and packet switched resources.

Figure 4:
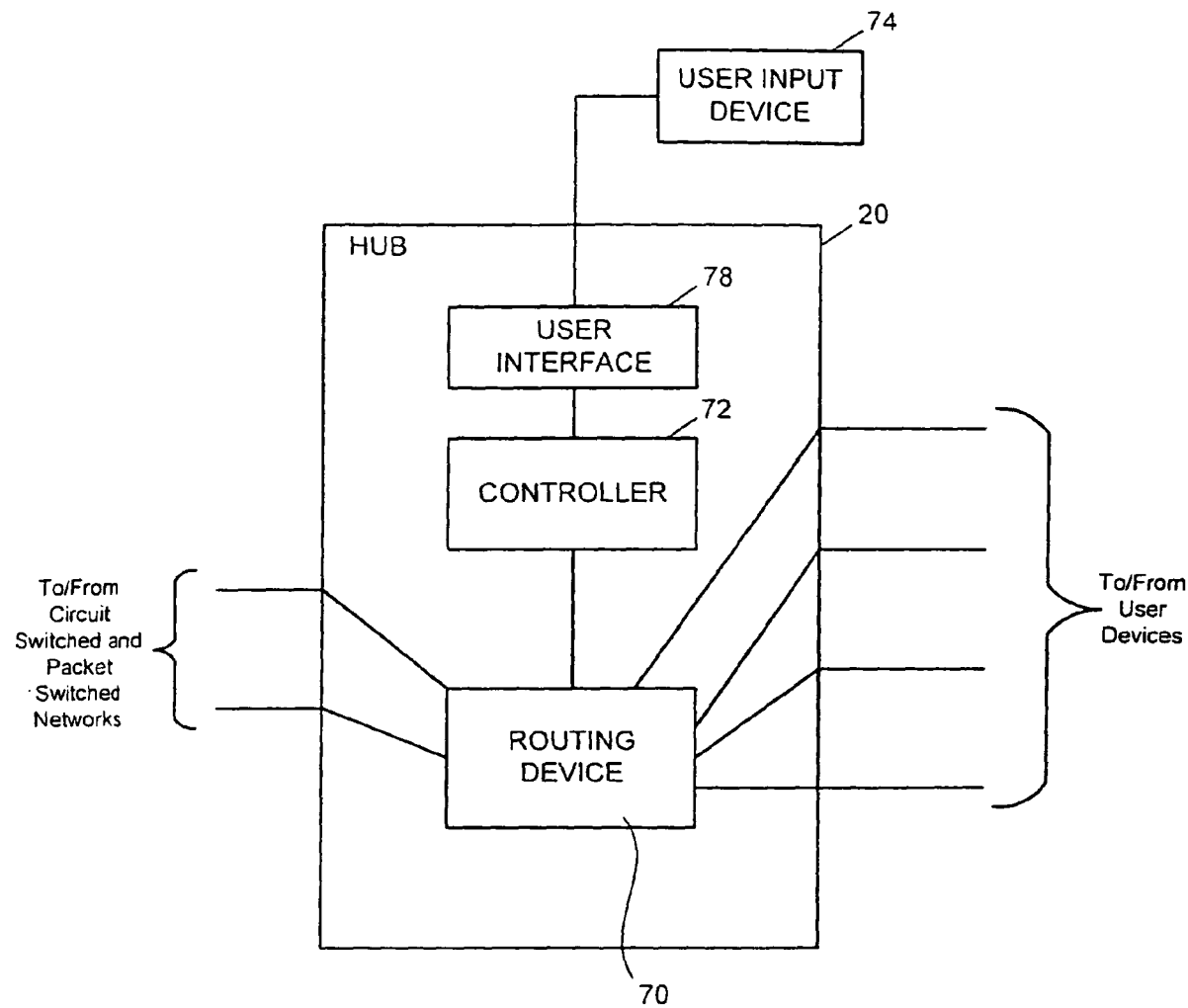
FIG. 4 is a block diagram illustrating an exemplary arrangement of components of a hub of the system of FIG. 1.

FIG. 4 schematically illustrates one embodiment of hub 20. The hub 20 includes a routing device 70 operable to route calls between the circuit and packet switched channels and the user devices 64, 68. The router 70 is preferably controlled by a controller 72 (or other suitable device) that may be programmed to automatically select which service (either circuit switched or packet switched) to use. The controller 72 may be preprogrammed to follow logic such as described below, or may be programmed by a user entering data into a user input device 74 which is coupled to the controller via user interface 78. It is to be understood that the function of the routing device 70 and controller 72 may be incorporated into a single device. Also, the routing device 70 and controller 72 may be integral with the hub 20 or external thereto. The router 70 and controller 72 may share a single processor or have separate processors.

Figure 5:
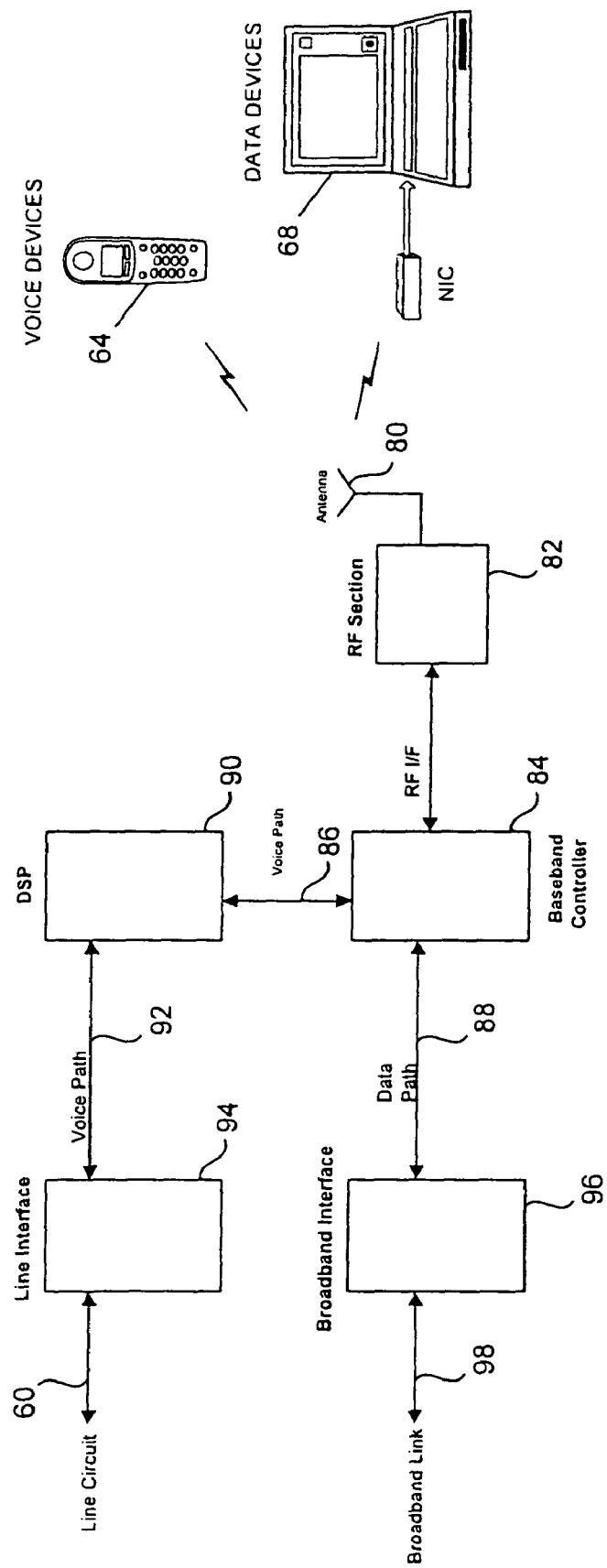
FIG. 5 is a schematic illustrating one embodiment of a hub configured for communication with wireless devices.

FIG. 5 illustrates one example of the system configured for interface with wireless devices (telephone 64, computer 68). The computer 68 includes a network interface card (NIC) configured for receiving and transmitting signals to an antenna 80. The antenna is connected to RF port 82 which interfaces with a baseband controller 84. The baseband controller 84 is coupled to a voice path 86 and a data path 88. The voice path 86 is connected to a digital signal processor (DSP) 90 which is coupled to a line interface 94 through voice path 92. The line interface 94 is connected to the packet switched and circuit switched networks via line 60. Data path 88 is connected to broadband interface 94 which is coupled to a broadband link 98.

Figure 6:
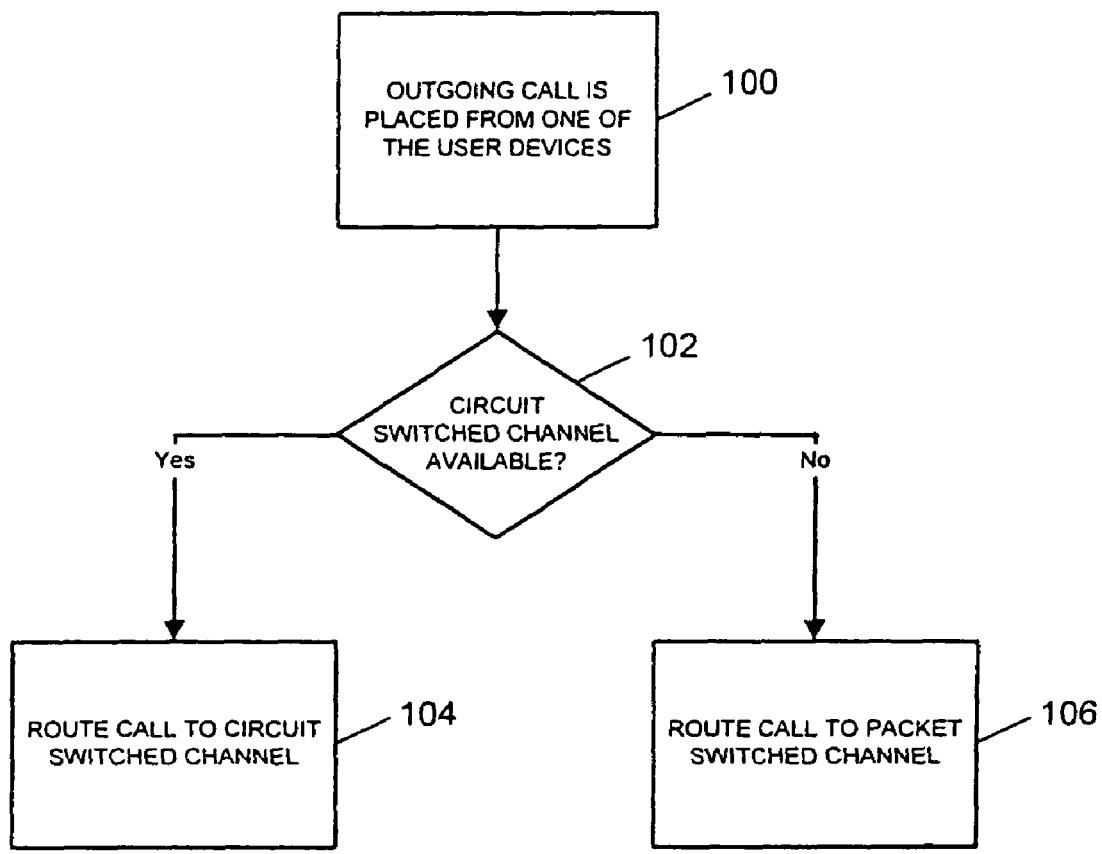
FIG. 6 is a flowchart illustrating a process for allocating circuit switched and packet switched resources while optimizing quality of service.

The controller 72 may be configured, for example, to use circuit switched service for voice applications when available to provide a high quality of service. However, when additional lines are needed and the circuit switched resources are not available, the system will allocate packet switched lines for voice applications. This process is shown in the flowchart of FIG. 6. An outgoing call is placed from one of the user devices at step 100. If a circuit switched channel is available, the call is routed to the circuit switched channel and placed using POTS, for example (steps 102 and 104). If no circuit switched lines are available, the call is routed to the packet switched channel and placed using VoIP, or other suitable application (steps 102 and 106).

Figure 7:
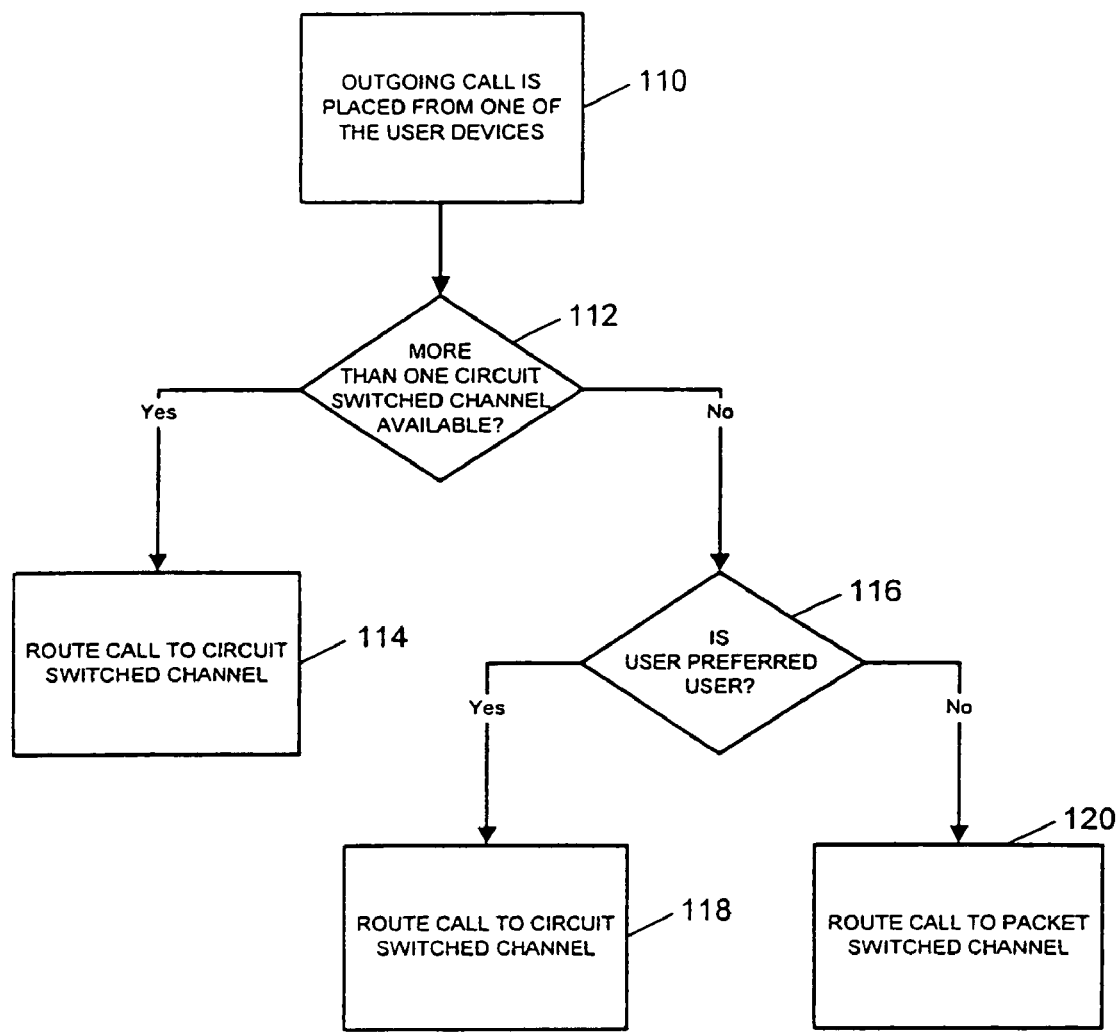
FIG. 7 is a flowchart illustrating a process for allocating circuit switched and packet switched resources based on a user's status.

The controller 72 may also be configured so that circuit switched resources are reserved for preferred users. For example, one or more users (such as high level personnel in an office) may have a preferred status. A list of preferred users is preferably stored in a database within the controller 72. FIG. 7 illustrates a process for routing calls based on the status of the user placing the call in a system having more than one circuit switched channel available. When a user places an outgoing call (step 110) the controller 72 first checks to see if more than one circuit switched channel is available (step 112). If more than one channel is available, the call will be placed using circuit switched resources (step 114). If only one circuit switched channel is available, it will be reserved for a preferred user. Thus, if the user is a preferred user, the call will be routed to the circuit switched channel (steps 116 and 118). If the user does not have preferred user status, the call will be routed to the packet switched channel (steps 116 and 120).

Alternatively, if appropriate equipment is available on both ends of a call prioritization can be automatically provided for. For example, the high priority caller may place a call at a time when there are no available circuit switched channels available. There is, however, at least one circuit switched channel in use by a low priority user. Through a protocol, the equipment at each end may request to move the low priority call to a packet switched channel. The low priority call is then switched without interruption of service or inconvenience to the user. The free circuit switched channel is now available for use by the high priority user.

Figure 8:
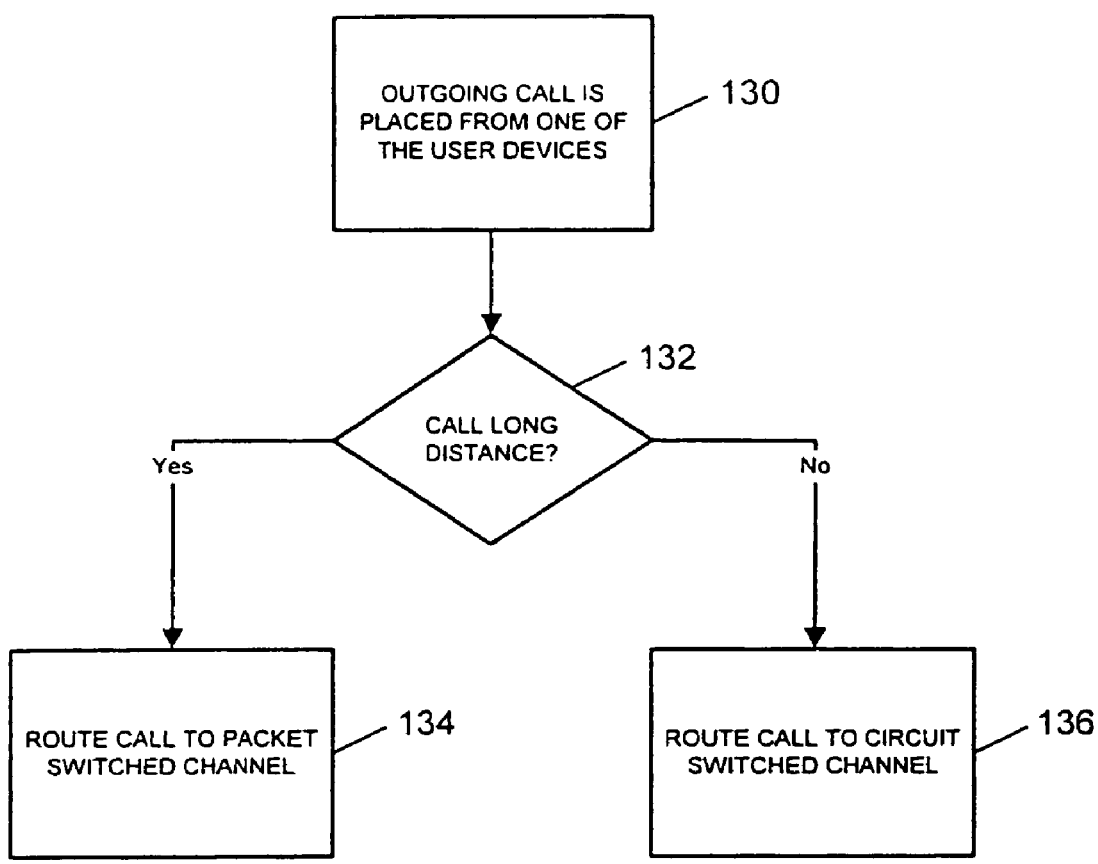
FIG. 8 is a flowchart illustrating a process for allocating circuit switched and packet switched resources while optimizing cost.

The controller 72 may also be configured to select a service based on cost of a call. For example, if a long distance call is made, the lower quality service (i.e., packet switched) may be acceptable since a cost saving is provided. FIG. 8 illustrates a process for routing calls based on cost. When an outgoing call is placed, the controller 72 first checks to see whether it is a long distance call (steps 130 and 132). If the call is a long distance call, it is routed to the packet switched channel (step 134), if not the call is routed to the circuit switched channel (step 136). The controller 72 may also route calls based on the location of the call (e.g., local or international).

Figure 9:
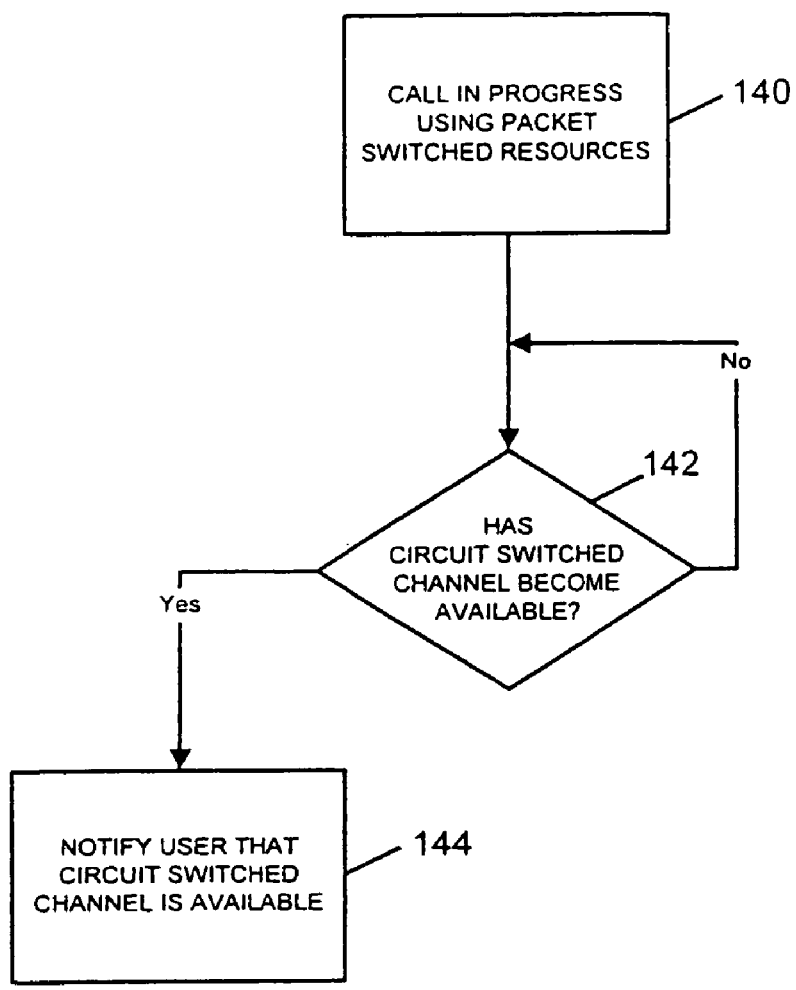
FIG. 9 is a flowchart illustrating a process for notifying a user that a circuit switched channel has become available.

The hub 20 may be configured to notify a user that has placed a call with the packet switched resources when a circuit switched channel is available, so that the user can hang up and make a new call using the circuit switched channel. This process allows a user to place a new call using the circuit switched service if the caller prefers a higher quality line. As shown in FIG. 9, the hub 20 notifies the user when a circuit switched channel becomes available (steps 140-144). The notification may be a message or signal played over the phone. The hub 20 may reserve the circuit switched line if the user selects to use it so that another user does not take the line, while the notified user hangs up and places a new call. If appropriate equipment is available on both ends of a call, as previously described, the call may be automatically switched to the circuit switched channel when it becomes available without the need for user intervention or call termination and redial.

The hub 20 may also be configured such that the user can inquire as to what resources are available before placing a call. For example, a user may not want to place a call using VoIP and therefore choose to wait until a POTS line is available.

It is to be understood that the logic described above for routing calls are only examples and that other configurations may be used without departing from the scope of the invention.

As can be observed from the foregoing, the system of the present invention provides numerous advantages over conventional systems. The system allows users to utilize conventional circuit switched services when available, thus providing traditional voice quality of service. However, when additional lines are needed, the system uses packet switched services (e.g., VOIP) to make additional lines available. Thus, a single connection can provide multiple phone lines.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of completing a voice connection, comprising:
   receiving a first communication request at a communication system configured to establish a communication over one of at least one channel of a first type of switching and at least one channel of a second type of switching, wherein the first type of switching is not the same as the second type of switching;
   determining that the first communication request has a high priority status and responsively deciding to establish the first communication over a channel of the first type of switching;
   switching an existing communication having a low priority status from a channel of the first type of switching to a channel of the second type of switching if no channel of the first type of switching is available for the first communication, wherein the channel of the first type of switching is selected from among the at least one channel of the first type of switching and the channel of the second type of switching is selected from among the at least one channel of the second type of switching; and establishing the first communication over the selected channel of the first type of switching.

2. The method of claim 1 further comprising sending a notification during a communication over a channel of the second type of switching when a channel of the first type of switching becomes available.

3. The method of claim 1 wherein receiving the communication request comprises receiving the communication request from a computer.

4. The method of claim 1 wherein receiving the communication request comprises receiving the communication request from a telephone.

5. The method of claim 1 wherein receiving the communication request comprises receiving the communication request from a wireless device.

6. The method of claim 1 further comprising switching an existing communication from a channel of the second type of switching to a channel of the first type of switching upon receiving a notification that the channel of the first type of switching is available.

7. The method of claim 1 further comprising:
receiving a second communication request at a communication system;
determining that the second communication request has a low priority status and responsively
deciding to establish the second communication over a channel of the first type of switching only if more than one channel of the first type of switching is available.

8. The method of claim 1 wherein the first type of switching comprises circuit switching and the second type of switching comprises packet switching.

9. A device, comprising:
means for receiving a first communication request;
means for establishing a communication over one of at least one channel of a first type of switching and at least one channel of a second type of switching, wherein the first type of switching is not the same as the second type of switching;
means for determining that the first communication request has a high priority status and responsively deciding to establish the first communication over a channel of the first type of switching;
means for switching an existing communication having a low priority status from a channel of the first type of switching to a channel of the second type of switching if no channel of the first type of switching is available for the first communication, wherein the channel of the first type of switching is selected from among the at least one channel of the first type of switching and the channel of the second type of switching is selected from among the at least one channel of the second type of switching; and
means for establishing the first communication over the selected channel of the first type of switching.

10. The device of claim 9 further comprising means for sending a notification during a communication over a channel of the second type of switching when a channel of the first type of switching is available.

11. The device of claim 9 further comprising means for switching an existing communication from a channel of the second type of switching to a channel of the first type of switching upon receiving a notification that the channel of the first type of switching is available.

12. The device of claim 9 further comprising:
means for receiving a second communication request at; and
means for determining that the second communication request has a low priority status and responsively
deciding to establish the second communication over a channel of the first type of switching only if more than one channel of the first type of switching is available.

13. The device of claim 9 wherein the first type of switching comprises circuit switching and the second type of switching comprises packet switching.

14. An apparatus, comprising:
a routing device, configured to:
establish a communication over one of at least one channel of a first type of switching and at least one channel of a second type of switching, wherein the first type of switching is not the same as the second type of switching, and
receive a first communication request; and
a controller, configured to:
determine that the first communication request has a high priority status and responsively decide to establish the first communication over a channel of the first type of switching;
switch an existing communication having a low priority status from a channel of the first type of switching to a channel of the second type of switching if no channel of the first type of switching is available for the first communication, wherein the channel of the first type of switching is selected from among the at least one channel of the first type of switching and the channel of the second type of switching is selected from among the at least one channel of the second type of switching, and
route the first communication over the selected channel of the first type of switching.

15. The apparatus of claim 14 wherein the router is further configured to send a notification during a communication over a channel of the second type of switching when a channel of the first type of switching is available.

16. The apparatus of claim 14 wherein the controller is configured to switch an existing communication from a channel of the second type of switching to a channel of the first type of switching upon receiving a notification that the channel of the first type of switching is available.

17. The apparatus of claim 14 wherein the controller is configured to establish a communication having a low priority status over a channel of the first type of switching only if more than one channel of the first type of switching is available.

18. The apparatus of claim 14 wherein the first type of switching comprises circuit switching and the second type of switching comprises packet switching.

* * * * *

UNITED STATES PATENT AND TRADEMARK OFFICE
CERTIFICATE OF CORRECTION

PATENT NO.       : 7,912,038 B2                                                   Page 1 of 1
APPLICATION NO.  : 11/105910
DATED            : March 22, 2011
INVENTOR(S)      : Berger et al.

It is certified that error appears in the above-identified patent and that said Letters Patent is hereby corrected as shown below:

Column 8, line 7, in Claim 12, delete "request at;" and insert -- request; --.

Signed and Sealed this
Sixteenth Day of August, 2011

David J. Kappos
*Director of the United States Patent and Trademark Office*